(12) United States Patent
Andres et al.

(10) Patent No.: US 6,398,531 B1
(45) Date of Patent: Jun. 4, 2002

(54) PUMP DRIVE SYSTEM

(75) Inventors: Gregg Andres, Kalamazoo; Kirk Strehlow, Parchment, both of MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/821,881

(22) Filed: Mar. 30, 2001

(51) Int. Cl.$^7$ ............................................... F01C 21/00
(52) U.S. Cl. ..................... 418/69; 418/171; 418/166; 192/85 AA; 192/3.29
(58) Field of Search ................ 418/69, 171, 166; 192/85 AA, 3.29

(56) References Cited

U.S. PATENT DOCUMENTS

| | | | |
|---|---|---|---|
| 2,413,081 A | * 12/1946 | Shaeffer | 418/69 |
| 3,700,362 A | * 10/1972 | Verge et al. | 418/69 |
| 4,183,425 A | 1/1980 | Sommer | |
| 4,437,551 A | * 3/1984 | Gimmler et al. | 192/3.29 |
| 4,958,712 A | 9/1990 | Suganuma et al. | |
| 5,370,511 A | * 12/1994 | Strikis et al. | 418/69 |
| 5,544,540 A | 8/1996 | Holman | |
| 5,752,810 A | * 5/1998 | Hein | 418/69 |
| 6,070,704 A | * 6/2000 | Sasse | 192/3.29 |
| 6,223,872 B1 | * 5/2001 | Heller et al. | 192/3.29 |

* cited by examiner

Primary Examiner—Thomas Denion
Assistant Examiner—Theresa Trieu
(74) Attorney, Agent, or Firm—Rader, Fishman & Grauer PLLC

(57) ABSTRACT

A drive system is provided for coupling a clutch assembly with a pump assembly that provides fluid power to cool, lubricate and control the operation of the clutch. The drive system comprises a drive coupling rotatably supported on an input shaft by a plurality of bearing members. The bearing members permit the drive coupling to rotate independent of the rotation of the input shaft. The drive coupling is provided with at least two splined surfaces for engaging a corresponding splined surface on both the clutch assembly and the pump. The drive system counteracts radial loads generated within the pump and moment loads generated at the splined connections to prevent premature wear or damage to the pumping elements and mating components.

20 Claims, 4 Drawing Sheets

PUMP DRIVE SYSTEM

FIELD OF THE INVENTION

The present invention relates generally to a drive system and more particularly to a pump drive and support structure.

BACKGROUND OF THE INVENTION

Wet clutch assemblies, which are clutches that use oil to cool and lubricate the clutch plates, are known in the art. Wet clutches are commonly positioned between an input device, such as an engine, and an output device, such as a transmission to engage/disengage the output device from the input device. Wet clutches are generally pressure engaged and spring disengaged for high horsepower applications or spring engaged and pressure disengaged for lower horsepower applications.

Gerotor pumps are commonly used with wet clutches to supply the hydraulic fluid needed for cooling, lubrication and pressure engagement/disengagement of the clutch. Gerotor pumps typically include internally toothed and externally toothed gear members rotatably disposed within a pump housing. The gear members are generally coupled to the input device in such a way as to rotate in proportion to the speed of the input device. A first gear member, or pinion gear, typically rotates on a longitudinal centerline common to the centerline of the clutch and pump itself. A second gear member, or ring gear, typically rotates on a longitudinal centerline parallel, but laterally separated from the centerline of the pinion gear. In this manner, the teeth on the respective gear members cooperate to define a plurality of variable volume pumping chambers. During rotation of the gear members, a pumping chamber increases in volume to a maximum volume and then decreases in volume. Fluid from the inlet port of the pump is drawn into the pumping chambers that are increasing in volume. Upon further rotation of the gerotor when the pumping chambers are decreasing in volume, the fluid is pushed out through the outlet port of the pump at a higher pressure.

In a conventional design, a gerotor pump is connected to the clutch assembly such that the rotation of a clutch input member provides rotational power to drive the pump. In this particular configuration, the pump is concentrically aligned in direct rotative connection with the wet clutch assembly. The connection is typically accomplished via the engagement of mating splined surfaces located on a clutch armature and the first gear member of the pump. In this manner, the pump is operational upon activation of the input device to immediately supply hydraulic fluid to the clutch. During operation of the pump, radial loads are generated by the high fluid pressures created as the volume of the pumping chambers is decreased. The direct splined connection between the clutch armature and pinion gear of the pump induces moment loads on the pinion gear of the pump and limits the ability of the mating components to counteract the radial loads, resulting in premature wear or possible damage to the pumping elements and mating components. The present invention provides an effective pump drive and support device that transfers rotative power between a clutch and a pump without premature wear or possible damage to the pumping elements or mating components.

SUMMARY OF THE INVENTION

The present invention provides an innovative drive system that couples a clutch assembly with a pump assembly to provide power to control operation of a clutch.

In accordance with an embodiment of the present invention, a drive system is disclosed that includes a drive coupling rotatably supported on an input shaft. The drive coupling includes a generally cylindrical body having a duct therethrough for receiving the input shaft. A bearing member is disposed in a groove on each end of the drive coupling between the body of the coupling and the input shaft to permit independent rotation of the drive coupling on the input shaft. A thrust washer is disposed on each end of the drive coupling proximate the bearing members to secure the bearing members in each groove. A locking member is preferably provided on both a forward end and a rearward end of the drive coupling proximate the thrust washers to secure the position of the drive coupling on the input shaft. The drive coupling further includes at least two connecting surfaces proximate each end of the body that engage a corresponding connecting inner surface of both an armature of thr clutch assembly and a pinion gear of the pump assembly. Upon activation of an input device, and provided the clutch is "disengaged", the drive coupling will rotate with the clutch assembly independent of the idle input shaft. The rotation of the drive coupling causes a pinion gear of the pump that is positioned concentric to the input shaft to rotate at a speed proportional to the speed of a clutch armature, thereby permitting operation of the pump. Operation of the pump provides fluid power to cool, lubricate and control operation of the clutch.

The foregoing drive system limits moment loads generated at the connecting surfaces and counteracts radial loads generated by the pumping elements to prevent premature wear or possible damage to the pumping elements and mating components. Moreover, the drive system permits differential rotation between the drive coupling and input shaft. Various additional aspects and advantages of this invention will become apparent to those skilled in the art from the following detailed description of the preferred embodiment, when read in light of the accompanying drawings.

BRIEF DESCRIPTION OF THE DRAWINGS

The features and inventive aspects of the present invention will become more apparent upon reading the following detailed description, claims, and drawings, of which the following is a brief description:

DESCRIPTION OF THE PREFERRED EMBODIMENT

Figure 1:
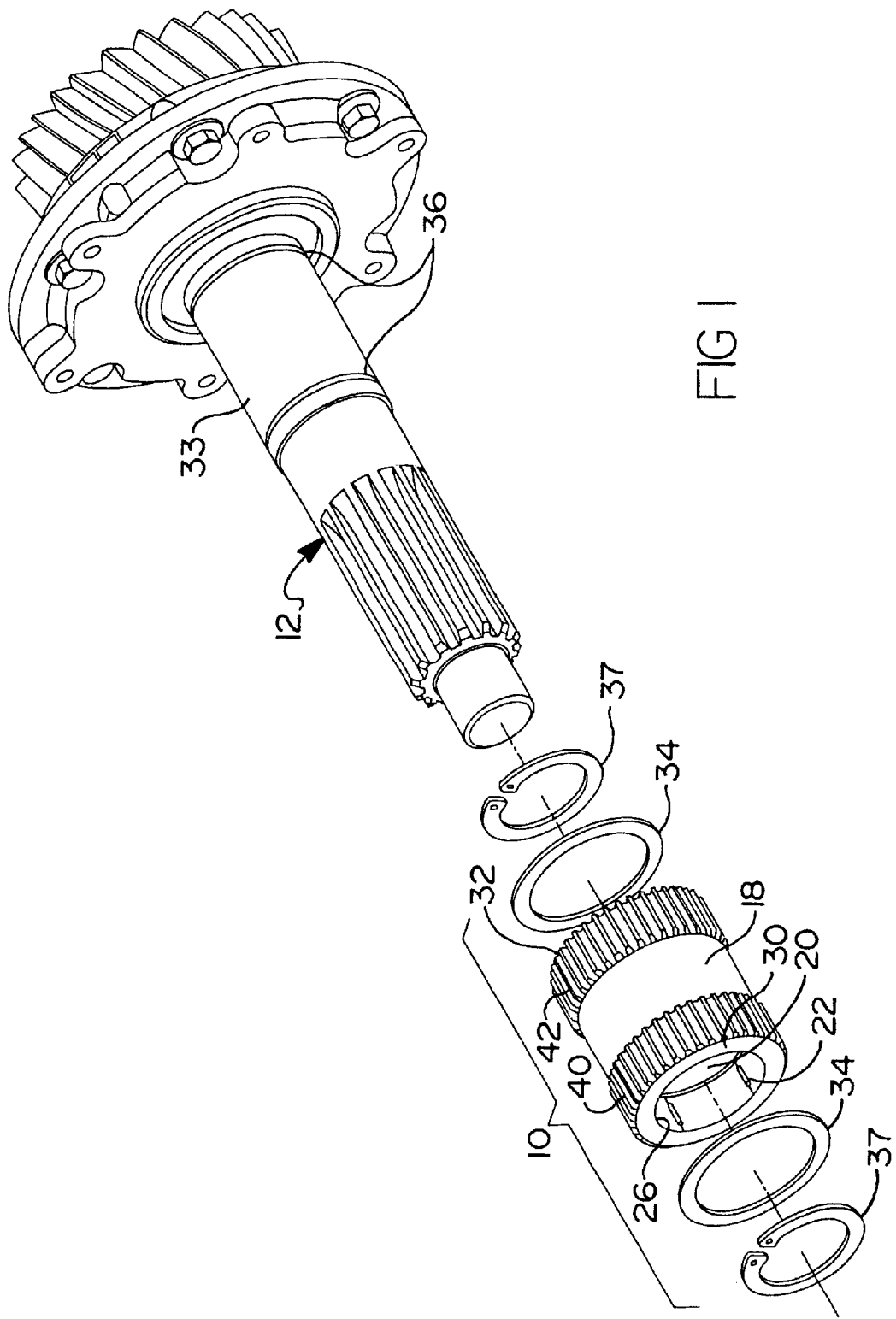
FIG. 1 is an exploded perspective view of an embodiment of the present invention showing a drive coupling and an input shaft assembly.
Figure 2:
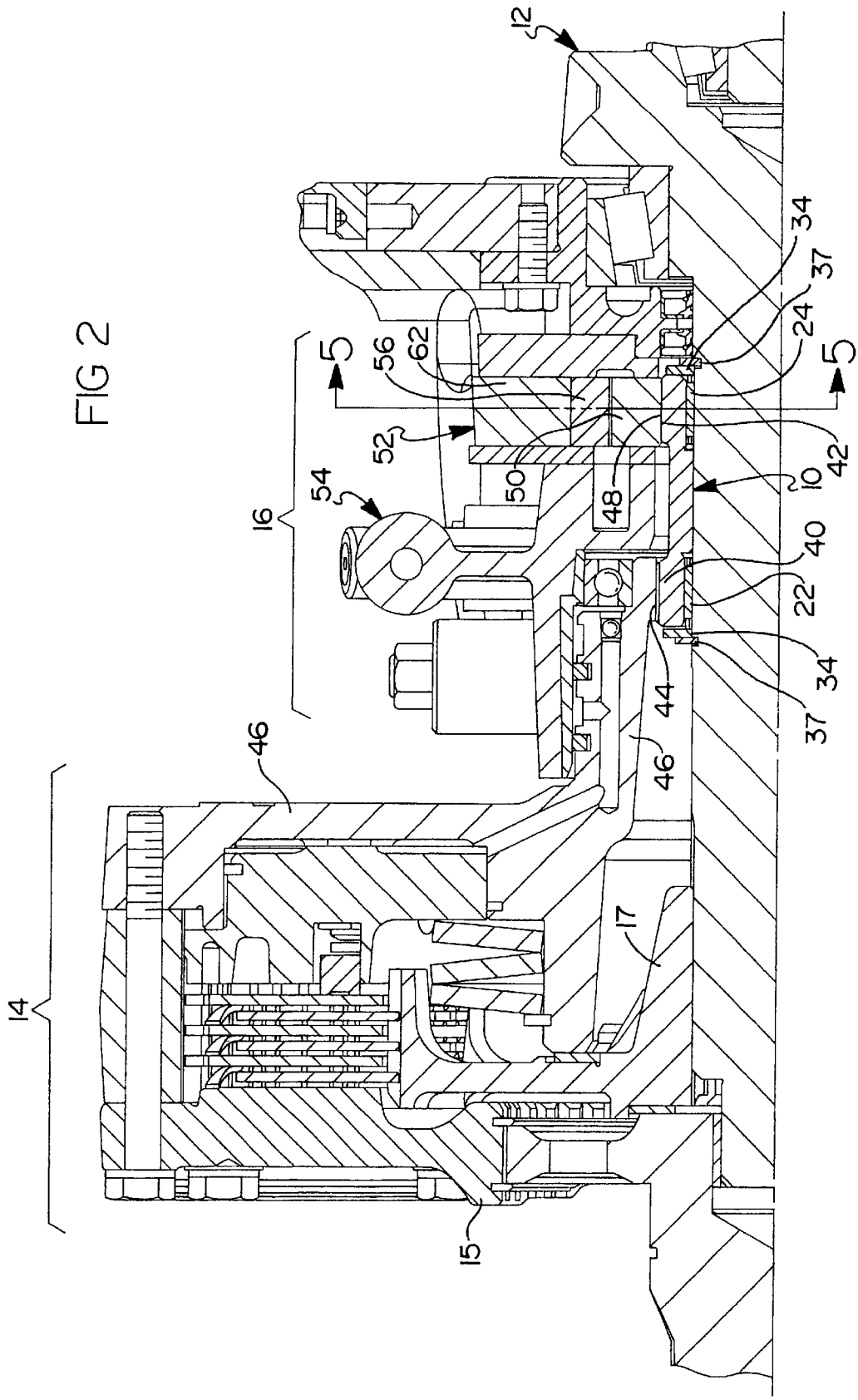
FIG. 2 is a sectioned view showing the drive coupling in splined engagement with a clutch armature and a pump assembly.

Referring now to the drawings, the preferred embodiments of the present invention are described in detail. Referring to FIGS. 1 and 2, a preferred embodiment of the present invention is shown that includes a drive coupling 10 rotatably supported on an input shaft 12 for transferring rotational power between a clutch assembly 14 and a pump assembly 16. Clutch assembly 14 generally includes an input member 15 and an output member 17 that rotate together when the clutch is "engaged" and independent of each other when the clutch is "disengaged." Generally, clutch assembly 14 is "engaged" when a plurality of plates attached to both input member 15 and output member 17 are forced into frictional contact, such that the plates rotate at substantially the same speed. Clutch input member 15 is generally coupled to an input device (not illustrated), such as an engine, in such a way as to rotate in proportion to the speed of the input device. Input shaft 12 is connected to output member 17 such that input shaft 12 rotates at a speed proportional to that of the input device when the clutch is "engaged." Input shaft 12 generally provides rotational input to a power-transmitting device (not illustrated), such as a transmission.

Figure 3:
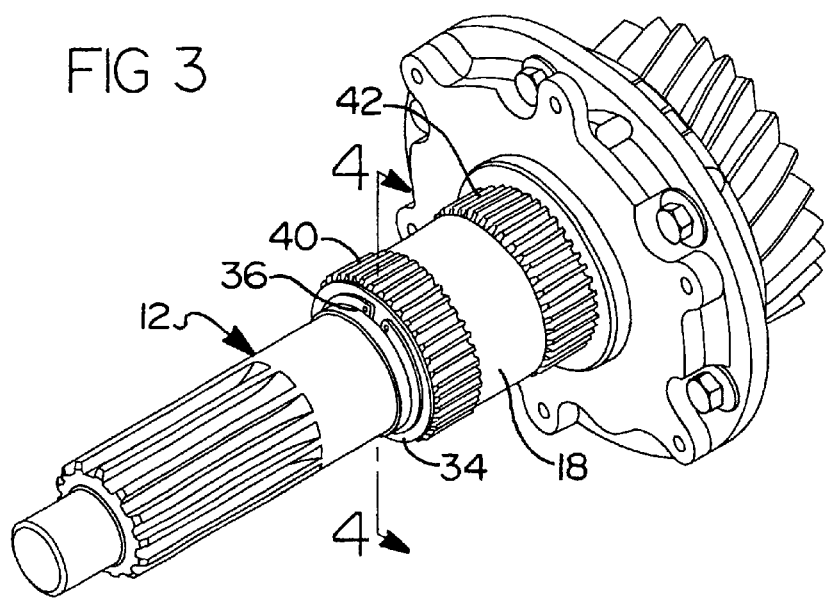
FIG. 3 is a perspective view showing the drive coupling assembled on the input shaft.
Figure 4:
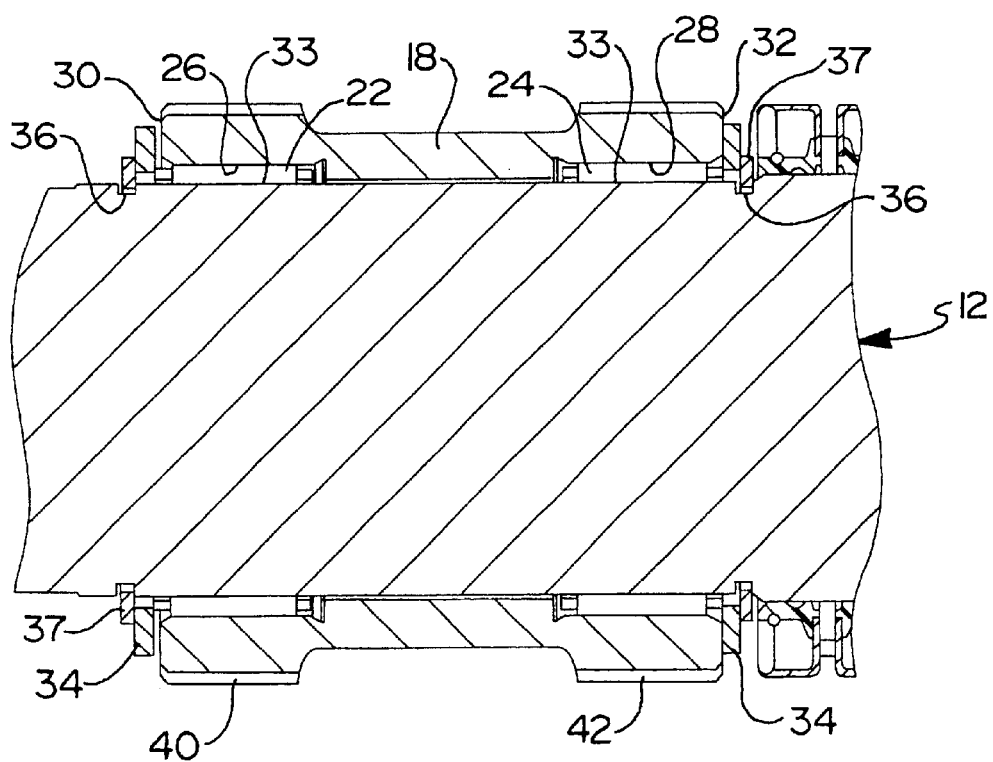
FIG. 4 is a sectioned view of the drive coupling and input shaft along the line 4—4 in FIG. 3.

Referring to FIGS. 1, 3 and 4, drive coupling 10 preferably includes a generally cylindrical body 18 having a duct 20 therethrough for receiving input shaft 12. A plurality of bearing members 22 and 24, such as a needle bearing, are preferably disposed in at least two grooves 26, 28 positioned at a forward end 30 and a rearward end 32 of drive coupling 10 respectively. Bearing members 22, 24 are positioned between body 18 and an external surface 33 of input shaft 12 to permit independent rotation of drive coupling 10 on input shaft 12. A thrust washer 34 is preferably disposed proximate each end 30, 32 of drive coupling 10 to secure the position of bearing members 22, 24 in grooves 26, 28 respectively. Surface 33 preferably includes one, and more preferably two grooves 36 for receiving a locking member 37, such as a snap ring. Locking member 37 is preferably positioned proximate thrust washers 34 to secure the position of drive coupling 10 on input shaft 12. Drive coupling 10 further includes two connecting surfaces 40, 42 that are preferably splined and more preferably positioned proximate each end 30, 32, respectively. Referring to FIG. 2, upon assembly of input shaft 12 into pump assembly 16 and clutch assembly 14, connecting surface 40 is positioned to engage a corresponding connecting inner surface 44 of a clutch armature 46. Similarly, connecting surface 42 is positioned to engage a corresponding connecting inner surface 48 of a pinion gear 50 located within pump assembly 16. Clutch armature 46 is secured to clutch input member 15 such that clutch armature 46 rotates at a speed proportional to the input device.

Figure 5:
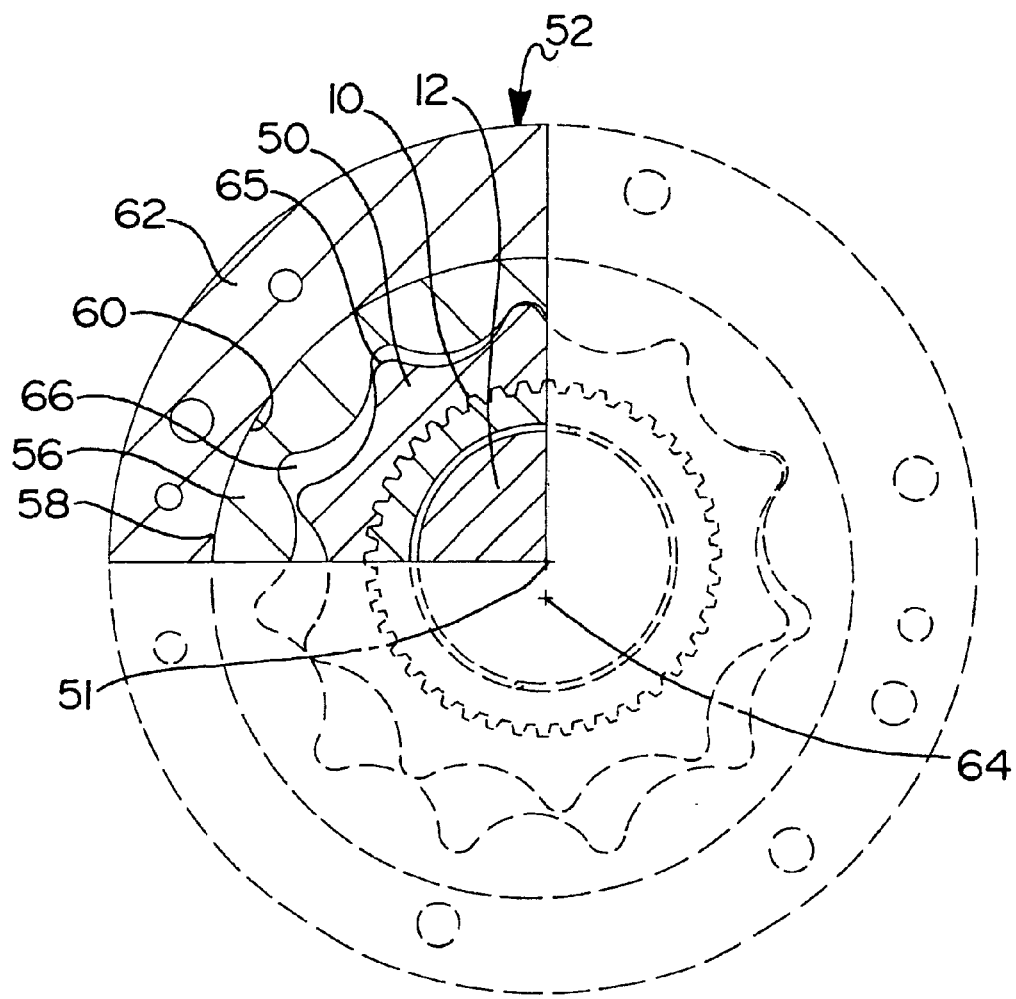
FIG. 5 is a sectioned view along the line 5—5 in FIG. 2.

Referring to FIGS. 2 and 5, pump assembly 16 is preferably positioned concentric to input shaft 12 along a first longitudinal centerline 51 and generally includes a pump 52 and a manifold 54. Pump 52, preferably of the gerotor type, generally includes a ring gear 56 having a cylindrical outside surface 58 that cooperates with a cylindrical inside surface 60 of a housing 62 in supporting the ring gear 56 for rotation about a second longitudinal centerline 64 parallel to and laterally separated from first longitudinal centerline 51 of pump assembly 16. Pinion gear 50 is disposed inside of ring gear 56 and coupled to drive coupling 10 for rotation as a unit with drive coupling 10 about first longitudinal centerline 51 of pump assembly 16. The lateral separation between longitudinal centerlines 51 and 64 and the teeth 65 on the respective gears 50 and 56 cooperate to define a plurality of variable volume pumping chambers 66, whereupon during rotation of the gear members, a pumping chamber 66 increases in volume to a maximum volume, then decreases in volume. Fluid from an inlet port (not illustrated) in pump assembly 16 is drawn into pumping chambers 66 that are increasing in volume. Upon further rotation of gears 50 and 56, pumping chambers 66 decrease in volume to push the fluid out through the pump's outlet port (not illustrated) at a higher pressure. Operation of pump assembly 16 provides fluid power to cool, lubricate and control the operation of clutch assembly 14.

Operation of drive coupling 10 will now be described with reference to FIGS. 2 and 5. Upon activation of the input device, drive coupling 10 begins to rotate at a speed proportional to the rotation of clutch armature 46. The rotation of drive coupling 10 causes pinion gear 50 in pump 52 to rotate at a speed proportional to the speed of clutch armature 46 to permit operation of pump assembly 16 as described above. During rotation of pinion gear 50 and ring gear 56, radial loads are generated as the fluid is compressed in pumping chambers 66 that are decreasing in volume. The effect of the radial loads produced by the compressed fluid can be characterized as a force that attempts to push pinion gear 50 and connected drive coupling 10 off center. Additionally, the connecting surfaces between drive coupling 10 and clutch armature 46 create a moment load on drive coupling 10. However, by rotatably supporting drive coupling 10 on input shaft 12, the radial and moment loads acting on drive coupling 10 are counteracted to prevent premature wear or possible damage to the components.

As described above, input shaft 12 remains idle when the clutch is "disengaged." Bearing members 22, 24 permit drive coupling 10 to rotate with clutch armature 46 independent of the idle input shaft 12. The independent rotation capability of drive coupling 10 on input shaft 12 permits different rotation speeds of the input shaft 12 and drive coupling 10 as the clutch is gradually engaged. As the clutch is engaged, the input shaft increases in speed until the speed of input shaft 12 is substantially proportional to the speed of drive coupling 10.

Accordingly, the present invention provides a pump drive and support restructure that permits concentric alignment of a pump assembly with an input shaft and clutch assembly. The inventive pump drive and support structure counteracts the radial and moment loads generated by the pump elements during operation of the pump to prevent premature wear or damage to the components. Additionally, the inventive pump drive and support structure allows differential rotation between the input shaft and the drive coupling.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A coupling for connecting a clutch assembly with a pump assembly that provides fluid power to control operation of said clutch assembly, said pump assembly being positioned concentric to an input shaft and possessing a longitudinal centerline common to said clutch assembly, said drive system comprising:

a body member rotatably supported on the input shaft, said body member extending from a first end to a second end;

a connecting surface positioned proximate each of said first and second ends for engaging a corresponding connecting surface of both the clutch assembly and the pump assembly to secure said body member to the clutch assembly and the pump assembly; and whereby said coupling is capable of rotation independent of the rotation of the input shaft.

2. The apparatus according to claim 1, wherein a groove is positioned proximate each end of said body.

3. The apparatus according to claim 2, wherein a bearing member is disposed in each of said grooves.

4. The apparatus according to claim 3, wherein each of said bearing members is a needle bearing.

5. The apparatus according to claim 3, wherein a washer is positioned proximate said bearing members.

6. The apparatus according to claim 5, wherein a locking member is positioned proximate said washer.

7. The apparatus according to claim 1, wherein said connecting surface comprises a splined surface.

8. A drive coupling for connecting a clutch assembly with a pump assembly that provides fluid power to control the clutch assembly, the pump assembly being positioned concentric to an input shaft and possessing a longitudinal centerline common to the clutch assembly, said drive system comprising:
- a body member rotatably supported on the input shaft, said drive coupling having a generally cylindrical body that extends from a forward end having a first connecting surface that engages an armature of the clutch assembly to a rearward end having a second connecting surface that engages a gear of the pump assembly;
- a groove positioned in said body member proximate each of said forward and rearward ends, each of said grooves having disposed therein a bearing member to permit rotation of said drive coupling independent of the rotation of said input shaft; and
    - whereby said drive coupling limits moment loads generated between the engaged surfaces and counteracts radial loads generated within the pump assembly.

9. The coupling according to claim 8, wherein each of said bearing members is a needle bearing.

10. The apparatus according to claim 8, wherein a washer is positioned proximate said bearing members.

11. The apparatus according to claim 10, wherein a locking member is positioned proximate said washer.

12. The apparatus according to claim 8, wherein said first and second connecting surfaces are splined surfaces.

13. The apparatus according to claim 12, wherein said armature and said gear each include a splined surface that engages said first and second connecting surfaces respectively.

14. A pump drive system that transmits rotational power between a clutch input member of a clutch assembly and a pump assembly that provides fluid power to operate the clutch assembly, said pump drive system comprising:
- a clutch armature secured to the clutch input member for rotation about a first longitudinal centerline;
- a first pump gear member that rotates about said first longitudinal centerline within a second pump gear member that rotates about a second longitudinal centerline laterally separated from said first longitudinal centerline, said first and second gear members cooperating to create a plurality of pumping chambers; and
- a drive coupling that engages said clutch armature and said first gear member, said drive coupling rotatably supported on an input shaft for rotation about said first longitudinal centerline;
    - whereby said pump drive system counteracts radial loads generated as fluid is compressed in said plurality of pumping chambers.

15. The pump drive system according to claim 14, wherein a groove is positioned proximate each end of said drive coupling.

16. The pump drive system according to claim 15, wherein a bearing member is disposed in each of said grooves.

17. The pump drive system according to claim 16, wherein each of said bearing members is a needle bearing.

18. The pump drive system according to claim 16, wherein a washer is positioned proximate said bearing members.

19. The pump drive system according to claim 18, wherein a locking member is positioned proximate said washer.

20. The pump drive system according to claim 14, wherein said drive coupling is secured to said clutch armature and said first gear member by splined engagement.

* * * * *